UNITED STATES PATENT OFFICE.

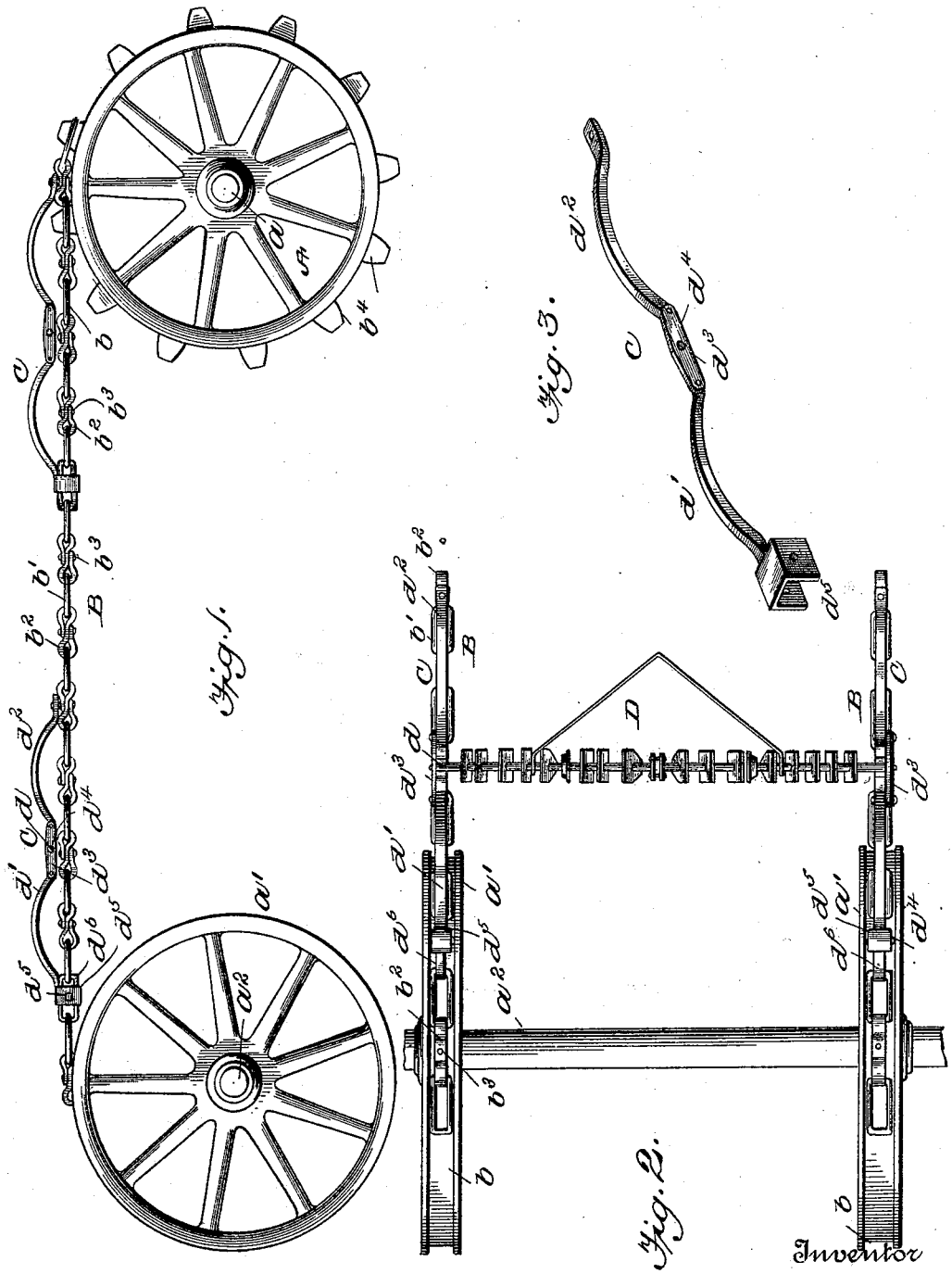

CAMIL PILON, OF GUNDERSON, MONTANA.

STIRRER FOR ORE-ROASTERS.

SPECIFICATION forming part of Letters Patent No. 548,088, dated October 15, 1895.

Application filed July 23, 1895. Serial No. 556,949. (No model.)

*To all whom it may concern:*

Be it known that I, CAMIL PILON, of Gunderson, in the county of Silver Bow and State of Montana, have invented certain new and useful Improvements in Stirrers for Ore-Roasters; and I do hereby declare the following to be a full, clear, and exact description of the invention, such as will enable others skilled in the art to which it appertains to make and use the same.

This invention contemplates certain new and useful improvements in stirrers for ore-roasters; and it has for its object the production of simple and highly-efficient means for connecting the plow or plows of a stirrer to the endless chain belts, whereby the plows will be held in proper position, especially in passing around the wheels, and the chain will be relieved of any undue strain consequent upon the plows striking an obstacle or the like. This I accomplish by providing bent or bowed bars, which form the bearings for the plows, said bars being each connected to the sprocket-chains at both ends, one end being made fast and the other movable or capable of sliding back and forth.

The invention will be hereinafter fully set forth, and particularly pointed out in the claims.

In the accompanying drawings, Figure 1 is a view in side elevation showing a sprocket-chain provided with my improvement. Fig. 2 is a plan view. Fig. 3 is a view of the bar detached.

Referring to the drawings, A designates a sprocket-wheel mounted on the main drive-shaft $a$, and $a'$ a wheel keyed on the rear shaft $a^2$. Two of such wheels A and $a'$ are usually mounted on the respective shafts.

B B designate two endless sprocket-chains, each of which is passed around one of the sprocket-wheels A and the large wheel $a'$. The latter has a peripheral groove $b$ to accommodate the chain. Each chain is composed of links $b'$ and doubly-bowed straps $b^2$, the ends of which are united to the center thereof by a bolt or rivet $b^3$. The teeth $b^4$ of the sprocket-wheel are of such distances apart as to accommodate the straps $b^2$, while the links $b'$ fit down over and inclose the teeth $b^4$.

C designates a bar attached to each sprocket-chain and designed to form the bearing for the axle $d$ of the plow D. Any number of these bars may be used, and those of one chain are opposite to those of the other. Each bar is preferably composed of two bowed or arched members $d'$ $d^2$ and a connecting-link $d^3$, pivotally connected thereto. In the center of this link is a hole or opening $d^4$ for the plow-axle $d$. The free end of the arched member $d^2$ is made fast to one of the straps $b^2$ by its bolt or rivet $b^3$, while the corresponding end of the member $d'$ is loosely articulated to the chain by means of a bolt $d^4$, passed through flanges $d^5$, and a loop $d^6$, substituted for one of the straps $b^2$. The flanges $d^5$ are parallel and fit on the opposite sides of loop $d^6$, the bolt $d^4$ serving to hold said end of member $d'$ in place and permitting the movement thereof within the length of said loop. The connecting-link usually remains close against the chain. In the passage of the chains around the sprocket-wheels and grooved wheels the bars are free to slide, and likewise while the plows are acting on the ore in the furnace in the event of any unequal obstruction being met, said bars being free to move, sudden strain upon the chains is avoided.

The advantages of my invention are apparent.

It will be observed that I have provided extremely simple and inexpensive means for connecting the plow-axles to the sprocket-chains of an ore-reducing furnace or roaster.

I claim as my invention—

1. A stirrer for ore-roasters, comprising wheels, endless chains engaging said wheels, plows, and bars connected to said chains having each a pivoted member acting as a bearing for the plow axle, as set forth.

2. A stirrer for ore-roasters, comprising wheels, endless chains engaging the same, plows, and bars connected each at one end fast to one of said chains, the other end being loosely secured thereto, as set forth.

3. A stirrer for ore-roasters, comprising wheels, endless chains engaging the same, plows, and bars connected to said chains consisting each of two arched members and a pivoted member uniting said former members and forming bearings for the plow-axle, substantially as set forth.

4. A stirrer for ore roasters, comprising wheels, endless chains engaging the same, plows, and bars consisting each of two arched members and a pivoted member forming bearings for the plow-axle, one of said bars being secured fast to said chain, the other one of said bars being loosely connected thereto, as set forth.

5. In a stirrer for ore-roasters, the combination with the wheels, and the chains engaging the same having loops therein, of the bars having two arched members and pivoted members forming bearings for the plow-axle, one of said members of each of said bars being rigidly attached to its chain at one end, and the other member having flanges, and bolts passed through said flanges and said loops, substantially as set forth.

In testimony whereof I have signed this specification in the presence of two subscribing witnesses.

CAMIL PILON.

Witnesses:
LOUIS EARRON,
FÉLIX BÉLANGER.